United States Patent
Trinkl et al.

(10) Patent No.: US 6,284,688 B1
(45) Date of Patent: Sep. 4, 2001

(54) REFRACTORY COMPOSITIONS

(75) Inventors: Gerd Trinkl, Borken; Manfred Fessel, Rhede; Vincent Edward Mellows; Reinhard Stötzel, both of Borken, all of (DE)

(73) Assignee: Foseco International Limited, Nechells (GB)

( * ) Notice: Subject to any disclaimer, the term of this patent is extended or adjusted under 35 U.S.C. 154(b) by 0 days.

(21) Appl. No.: 08/411,790

(22) PCT Filed: Nov. 29, 1993

(86) PCT No.: PCT/GB93/02451

§ 371 Date: Apr. 7, 1995

§ 102(e) Date: Apr. 7, 1995

(87) PCT Pub. No.: WO94/14727

PCT Pub. Date: Jul. 7, 1994

(30) Foreign Application Priority Data

Dec. 22, 1992 (GB) .................................................. 9226662

(51) Int. Cl.⁷ .................................................. C04B 35/66
(52) U.S. Cl. ................................ 501/84; 501/85; 501/111; 501/127; 501/128
(58) Field of Search ................................ 501/84, 85, 127, 501/128, 111

(56) References Cited

U.S. PATENT DOCUMENTS

| 2,499,729 | | 3/1950 | Daussan . | |
| 4,028,122 | * | 6/1977 | Greenewald, Jr. | 501/127 X |
| 4,168,177 | | 9/1979 | Indelicato et al. . | |
| 4,432,799 | * | 2/1984 | Salazar | 501/111 |
| 4,575,439 | * | 3/1986 | Hintzen et al. | 501/84 X |
| 4,814,300 | * | 3/1989 | Helferich | 501/84 |
| 4,871,495 | * | 10/1989 | Helferich et al. | 501/84 X |
| 5,284,808 | * | 2/1994 | Damiano et al. | 501/111 |

FOREIGN PATENT DOCUMENTS

| 0 064 863 A1 | 11/1982 | (EP) . |
| 0 065 034 A1 | 11/1982 | (EP) . |
| 0 426 848 A1 | 5/1991 | (EP) . |
| 2 018 410 | 10/1979 | (GB) . |
| 3-21505 | 3/1991 | (JP) . |
| 1599346 | 10/1990 | (SU) . |
| WO 92/09542 | 6/1992 | (WO) . |

* cited by examiner

Primary Examiner—Karl Group
(74) Attorney, Agent, or Firm—Nixon & Vanderhye P.C.

(57) ABSTRACT

Substantially dry, self-hardening, thermally activated refractory compositions, suitable for use to produce linings for furnaces or metallurgical vessels such as ladles, tundishes or launders, comprise particulate refractory material, an inorganic binder having associated therewith chemically or physically bound water such as sodium metasilicate pentahydrate or tribasic sodium phosphate dodecahydrate, and an element or compound, such as aluminium, which will react exothermically with the inorganic binder. The compositions may also contain an inhibitor such as a mineral oil or a vegetable oil to inhibit premature exothermic reaction.

8 Claims, No Drawings

REFRACTORY COMPOSITIONS

This invention relates to refractory compositions which are used in their dry state to produce refractory articles, for example linings for furnaces or metallurgical vessels such as ladies, tundishes or launders.

Refractory products, whether they be pre-formed articles for a particular application or linings for furnaces or metallurgical vessels are usually produced by methods, such as ramming, trowelling, spraying or casting, using wet refractory compositions in the form of an aqueous slurry or a mouldable or castable mass. Such methods have disadvantages in that they are time consuming since apart from the initial application or forming process they require a drying step and often additional calcining or sintering steps. It is also necessary to maintain the composition in a suitable condition for application and this can be a problem because the solid materials tend to settle. Some of the methods, for example, spraying, require relatively complex equipment which in use can become blocked, and all the wet methods require an on-site supply of water for producing the compositions in a form suitable for application.

Alternative methods have therefore been proposed which involve the use of substantially dry refractory compositions which can be set or hardened by heat after forming or application.

European Patent Application Publication No. 0064863 describes a method of applying a monolithic refractory layer within a metallurgical vessel using a substantially dry particulate mixture comprising at least 70% by weight of refractory aggregate, at least 0.5% by weight of thermosetting resin, from about 0.5% to 10% by weight of an inorganic binder and optionally from about 0.5% to 10% of an inorganic hydrate.

International Patent Application Publication No. WO 92/09542 describes a thermally activated, dry refractory composition which is used for the production of a new refractory lining or the repair of an existing refractory lining in a furnace or other high-temperature vessel. The composition may consist of from about 35% to about 85% by weight of a refractory aggregate and from about 15% to about 50% by weight of a hydrated material containing from about 5 to about 9 moles of chemically bound water in crystalline form, the water constituting from about 7% to about 35% by weight of the total composition.

The hydrated material is present in a sufficient amount, with respect to the amount of chemically bound water contained therein, to provide moisture to the composition to cause self-flowability of the composition when the composition is applied to a hot surface to be lined or repaired.

It has now been found that the performance of dry refractory compositions containing an inorganic binder having chemically or physically bound water can be improved if the composition also contains an element or compound which will react exothermically with the inorganic binder.

According to the invention there is provided a substantially dry, self-hardening, thermally activated refractory composition comprising a particulate refractory material, an inorganic binder having associated therewith chemically or physically bound water and an element or compound which will react exothermically with the inorganic binder, characterised in that the composition contains 70% to 95% by weight of particulate refractory material, 1% to 15% by weight of the inorganic binder (including the chemically or physically bound water) and 1% to 15% by weight of the element or compound which will react exothermically with the inorganic binder.

The particulate refractory material may be, for example, silica, zircon, silicon carbide, alumina (corundum), magnesia (calcined magnesite), calcined dolomite, chrome magnesite, olivine, forsterite, mullite, kyanite, andalusite, chamotte, carbon or chromite or a mixture of two or more of those materials.

The composition may also contain low density particulate refractory materials such as expanded perlite, expanded vermiculite, diatomaceous earth or fly ash floaters in order to reduce the density of the cured composition if desired.

Examples of suitable inorganic binders having chemically bound water associated therewith are crystalline hydrated salts such as silicates, carbonates, sulphates, nitrates, borates or phosphates. These salts include sodium metasilicate pentahydrate, sodium metasilicate nonahydrate, aluminum sulphate octadecahydrate, magnesium sulphate heptahydrate, sodium tetraborate decahydrate, magnesium carbonate trihydrate, magnesium nitrate hexahydrate, aluminium potassium sulphate dodecahydrate, aluminium sodium sulphate dodecahydrate and tribasic sodium phosphate dodecahydrate. Sodium silicate pentahydrate and tribasic sodium phosphate dodecahydrate are preferred. Examples of suitable inorganic binders having physically bound water associated therewith are micro-encapsulated sodium silicate solution (waterglass) and micro-encapsulated aqueous aluminium orthophosphate solution.

The element or compound which will react exothermically with the inorganic binder may be, for example, ferrosilicon, calcium oxide, magnesium oxide, aluminium or cement. Aluminium is preferred and can be used as a powder or as small particles of foil.

In order to prevent premature reaction between the inorganic binder and the element or compound which will react exothermically with the binder, it may de desirable to include in the composition an inhibitor for example a mineral or vegetable oil. When used the inhibitor will usually constitute from about 0.1% to about 5% by weight of the refractory composition.

The substantially dry refractory compositions of the invention may be prepared by thoroughly mixing together the individual components.

The compositions may be used to produce refractory articles by various means, for example, by filling a suitable mould, or in the case of the production of a lining in a metallurgical vessel by filling the space between the surface to be lined and a suitable former with the composition, and then locally heating the composition to initiate a hardening reaction between the inorganic binder and the element or compound which reacts exothermically with the binder. Local heating of the composition may be achieved by using a mould, former or vessel which is at least partly heated or by applying heat to a portion of the composition, for example by means of a gas torch.

The refractory compositions of the invention are substantially dry flowable powders which may be readily used for a variety of applications, and in particular for producing facing or backing linings for furnaces or for metallurgical vessels such as ladles, tundishes, launders or pot cells used in the smelting of aluminium, and for producing refractory shapes. The compositions have a relatively short curing time so that shapes, linings etc. are ready for use relatively quickly, and they can be formulated so as to produce light-weight, highly heat-insulating articles.

The following Examples will serve to illustrate the invention:

EXAMPLE 1

A substantially dry, self-hardening thermally activated refractory composition was prepared by mixing together the following components in the proportions indicated:

| | % By Weight |
|---|---|
| Chamotte (45.6% Al$_2$O$_3$; 1–3 mm) | 46.00 |
| Chamotte (45.6% Al$_2$O$_3$; up to 1 mm) | 22.50 |
| Kyanite (less than 35 mesh DIN) | 9.00 |
| Andalusite (up to 0.16 mm) | 4.50 |
| Sprayed aluminium powder | 3.00 |
| Aluminium foil powder | 10.00 |
| Sodium metasilicate pentahydrate | 4.50 |
| Oil (AVILUB RS22) | 0.50 |

The composition was used to produce cylinders 50 mm in diameter and 50 mm in height by ramming the composition into cardboard tubes and curing by applying a bunsen burner flame on top of the rammed composition. The cured cylinders were stripped from the cardboard tubes after 10 minutes.

The compression strength of some of the cylinders was measured at room temperature, and other cylinders were heated up to 1500° C. at a rate of 400° C. per hour and then cooled to room temperature at the same rate and their compression strength determined. The measurements were done on a hydraulic press fitted with a gauge giving valves in kp.

The permeability of the cylinders was determined using a GP permeability tester of the type used for determining the permeability of foundry sand test cores.

The density of cylinders was determined both before and after heating to 1500° C. and the volume expansion resulting from the heating to 1500° C. was also measured.

The average result obtained are listed below:

| | |
|---|---|
| Permeability (room temperature) | 650 |
| Permeability (1500° C.) | 460 |
| Density (room temperature) | 1.20 g/cm$^3$ |
| Density (1500° C.) | 1.25 g/cm$^3$ |
| Volume expansion | 8.9% |
| Compression strength (room temperature) | 45 kp |
| Compression strength (1500° C.) | 292 kp |

EXAMPLE 2

A composition similar to that of Example 1 was prepared by mixing the following components in the proportions indicated;

| | % By Weight |
|---|---|
| Chamotte (45.6% Al$_2$O$_3$; 1–3 mm) | 30.00 |
| Chamotte (45.6% Al$_2$O$_3$; up to 1 mm) | 26.00 |
| Chamotte (70.5% Al$_2$O$_3$; up to 1 mm) | 20.00 |
| Chamotte (38.8% Al$_2$O$_3$; 0.25–1 mm) | 8.00 |
| Kyanite (less than 35 mesh DIN) | 3.35 |
| Sprayed aluminum powder | 3.00 |
| Aluminium foil powder | 5.00 |
| Sodium metasilicate pentahydrate | 4.50 |
| Oil (AVILUB RS22) | 0.15 |

The composition was used and tested as described in Example 1 except that compression strengths were also determined on cylinders which had been heated to 500° C., 700° C., 1000° C. and 1200° C. respectively and then cooled.

The average results obtained are listed below:

| | |
|---|---|
| Permeability (room temperature) | 340 |
| Permeability (1500° C.) | 330 |
| Density (room temperature) | 1.19 g/cm$^3$ |
| Density (1500° C.) | 1.17 g/cm$^3$ |
| Volume expansion | 6.1% |
| Compression strength (room temperature) | 114 kp |
| Compression strength (500° C.) | 119 kp |
| Compression strength (700° C.) | 272 kp |
| Compression strength (1000° C.) | 214 kp |
| Compression strength (1200° C.) | 400 kp |
| Compression strength (1500° C.) | 800 kp |

EXAMPLE 3

A substantially dry, self-hardening, thermally activated refractory composition for use as a metal casting ladle lining was prepared by mixing together the following compositions, A and B, in a weight ratio of 1:1 for 15 minutes in a concrete mixer:

| | A % By Weight | B % By Weight |
|---|---|---|
| Chamotte (45.6% Al$_2$O$_3$; 1–3 mm) | 20.0 | 40.0 |
| Chamotte (45.6% Al$_2$O$_3$; up to 1 mm) | 20.0 | 40.0 |
| Chamotte (70.5% Al$_2$O$_3$; up to 1 mm) | 25.8 | 10.2 |
| Chamotte (38.8% Al$_2$O$_3$; 0.25–1 mm) | 16.0 | — |
| Kyanite (less than 35 mesh DIN) | 6.8 | — |
| Sodium metasilicate pentahydrate | — | 9.0 |
| Sprayed aluminium powder | 6.0 | — |
| Aluminium foil powder | 5.0 | — |
| Oil (AVILUB RS22) | 0.4 | 0.8 |

After mixing the composition was rammed on the bottom of a pot ladle. A former was then placed inside the ladle and the space between the former and the inner surface of the ladle was filled with the composition to produce a lining. The composition was heated locally at one spot by a flame and allowed to self-harden for 20 minutes. The former was then removed and the surface of the formed lining was coated with a zircon based coating, CERAMOL 258.

The compression strength of the lining material was determined using the procedure described in Example 1 immediately after stripping, after heating to 1000° C. and after heating to 1500° C.

The permeability, density and volume expansion were also determined using the procedures described in Example 1.

The rate of heat loss through the material and the total heat loss after 1 hour were determined on a cured slab of the material using AMITEC equipment of the type described in British Patent No. 1018703.

The following results were obtained;

| | |
|---|---|
| Compression strength (room temperature) | 307 kp |
| Compression strength (1000° C.) | 398 kp |
| Compression strength (1500° C.) | 792 kp |
| Permeability (room temperature) | 142 |
| Permeability (1500° C.) | 198 |
| Density (room temperature) | 1.634 g/cm$^3$ |
| Density (1500° C.) | 1.573 g/cm$^3$ |
| Volume expansion | 3.9% |
| Rate of heat loss | 0.6 cal/cm$^2$ · s |
| Heat loss after 1 hour | 300 cal/cm$^2$ |

A typical refractory concrete of the type used to line ladles has the rate of heat loss of the order of 0.8 cal/cm$^2$.s and a heat loss after 1 hour of 4000 cal/cm$^2$ when measured using the same equipment.

EXAMPLE 4

25 kg of the following composition were prepared by mixing together the individual constituents for 15 minutes in a concrete mixer:

| | % By Weight |
|---|---|
| Chamotte (45.6% Al$_2$O$_3$; 1–3 mm) | 31.75 |
| Chamotte (45.6% Al$_2$O$_3$; up to 1 mm) | 31.75 |
| Chamotte (70.5% Al$_2$O$_3$; up to 1 mm) | 5.40 |
| Fly ash floaters | 25.71 |
| Sodium metasilicate pentahydrate | 4.76 |
| Oil (AVILUB RS22) | 0.63 |

5.8% by weight based on the weight of the above composition of sprayed aluminium powder was then added and mixing was continued for 10 minutes.

Some of the composition was tested as described in Example 1 so as to determine its cured room temperature compression strength and density. The cured composition had a compression strength of 61 N/cm$^2$ and a density of 0.9 g/cm$^3$.

Sufficient of the composition to form a base about 25 mm thick was placed on the base of a steel ladle which had vent holes 2–3 mm diameter spaced at 100 mm intervals in the base and at 150 mm in the side wall. A preformed INSURAL ladle lining (available from Foseco companies) having a diameter 4 cm smaller than the diameter of the steel ladle was bedded on the composition on the base of the ladle so as to form a space between the INSURAL lining and the side wall of the ladle. The rest of the composition which was free flowing and required little compaction was then poured into the space so as to fill the space to the top of the ladle. A gas torch was then applied to the outside of the base of the ladle so as to trigger an exothermic reaction in the backing composition. After about 45 minutes the reaction had progressed throughout the whole of the backing and the composition had fully cured, and the lined ladle was then used for holding molten aluminium.

EXAMPLE 5

A composition identical to that described in Example 4 except that it contained tribasic sodium phosphate dodecahydrate instead of sodium metasilicate pentahydrate was prepared and tested.

The cured composition had a compression strength of 186 N/cm$^2$ and a density of 0.86 g/cm$^3$.

What is claimed is:

1. A substantially dry, self-hardening, thermally activated refractory composition comprising a particulate refractory material, an inorganic binder having chemically or physically bound water associated therewith and an element or compound which will react exothermically with the inorganic binder, characterized in that the composition contains 70% to 95% by weight of particulate refractory material, 1% to 15% by weight of the inorganic binder, including the chemically or physically bound water and 1% to 15% by weight of the element or compound which will react exothermically with the inorganic binder; and wherein the inorganic binder has physically bound water associated therewith and comprises micro-encapsulated sodium silicate solution or micro-encapsulated aqueous aluminum orthophosphate solution.

2. A substantially dry, self-hardening, thermally activated refractory composition comprising a particulate refractory material, an inorganic binder having chemically or physically bound water associated therewith and an element or compound which will react exothermically with the inorganic binder, characterized in that the composition contains 70% to 95% by weight of particulate refractory material, 1% to 15% by weight of the inorganic binder including the chemically or physically bound water, and 1% to 15% by weight of the element or compound which will react exothermically with the inorganic binder; and wherein the composition also contains a mineral oil or a vegetable oil.

3. A refractory composition according to claim 2, wherein the mineral oil or vegetable oil is present in an amount of from 0.1% to 5% by weight.

4. A refractory composition according to claim 2, wherein the inorganic binder has chemically bound water associated therewith, and comprises a crystalline hydrated salt selected from the group consisting of silicates, carbonates, sulphates, nitrates, borates and phosphates.

5. A substantially dry, self-hardening, thermally activated refractory composition comprising:
   a particulate refractory material in the amount of between 70–95% by weight;
   an inorganic binder having chemically or physically bound water associated therewith in the amount of 1–15% by weight; and
   an element or compound which will react exothermically with the inorganic binder, said element or compound in the amount of 1–15% by weight, and said element or compound comprising calcium oxide, magnesium oxide, or aluminum;
   said refractory material held by said inorganic binder after exothermic reaction with said element or compound so as to provide a substantially dry, self-hardened, thermally activated refractory composition.

6. A refractory composition according to claim 5, further comprising a mineral oil or vegetable oil in an amount of 0.1–5% by weight.

7. A substantially dry, self-hardening, thermally activated refractory composition comprising:
   a particulate refractory material in the amount of between 70–95% by weight;
   a binder, said binder consisting essentially of an inorganic binder having chemically or physically bound water associated therewith in the amount of 1–15% by weight; and
   an element or compound which will react exothermically with the inorganic binder, said element or compound in the amount of 1–15% by weight, said element or compound being aluminum, calcium oxide, or magnesium oxide;

said refractory material held by said inorganic binder after exothermic reaction with said element or compound so as to provide a substantially dry, self-hardened, thermally activated refractory composition.

8. A substantially dry, self-hardening, thermally activated refractory composition comprising:

a particulate refractory material in the amount of between 70–95% by weight, and wherein said particulate refractory material is silica, zircon, silicon carbide, alumina, magnesia, calcined dolomite, chrome magnesite, olivine, forsterite, mullite, kyanite, andalusite, chamotte, carbon, or chromite, or a mixture of two or more of those materials;

a binder, said binder consisting essentially of an inorganic binder having chemically or physically bound water associated therewith in the amount of 1–15% by weight, and wherein the inorganic binder has chemically bound water associated therewith, and comprises a crystalline hydrated salt selected from the group consisting of silicates, carbonates, sulphates, nitrates, borates and phosphates;

an element or compound which will react exothermically with the inorganic binder, said element or compound in the amount of 1–15% by weight;

said refractory material held by said inorganic binder after exothermic reaction with said element or compound so as to provide a substantially dry, self-hardened, thermally activated refractory composition; and a mineral oil or vegetable oil in an amount of 0.1–5% by weight.

* * * * *